United States Patent
Sagawa

(10) Patent No.: US 7,388,489 B2
(45) Date of Patent: Jun. 17, 2008

(54) SYSTEM AND METHOD FOR MANAGING DATA ON AN RFID TAG ASSOCIATED WITH A PRODUCT

(75) Inventor: Toyoaki Sagawa, Torrance, CA (US)

(73) Assignee: GSK Solutions LLC, Torrance, CA (US)

( * ) Notice: Subject to any disclaimer, the term of this patent is extended or adjusted under 35 U.S.C. 154(b) by 251 days.

(21) Appl. No.: 11/165,119

(22) Filed: Jun. 24, 2005

(65) Prior Publication Data

US 2006/0290500 A1    Dec. 28, 2006

(51) Int. Cl.
G08B 13/14    (2006.01)

(52) U.S. Cl. .............. 340/572.1; 340/572.4; 340/539.1; 340/539.16; 340/825.69; 340/5.21; 340/5.61

(58) Field of Classification Search .............. 340/572.1, 340/572.4, 539.16, 825.69, 5.21, 5.61, 539.1; 235/375, 376, 380, 385; 700/116, 225, 1
See application file for complete search history.

(56) References Cited

U.S. PATENT DOCUMENTS

| | | | |
|---|---|---|---|
| 6,563,417 B1 | 5/2003 | Shaw | 340/10.1 |
| 6,587,768 B2 | 7/2003 | Chene et al. | 701/33 |
| 6,714,121 B1 | 3/2004 | Moore | 340/10.3 |
| 6,717,516 B2 | 4/2004 | Bridgelall | 340/572.1 |
| 6,747,560 B2 | 6/2004 | Stevens, III | 340/572.4 |
| 6,750,765 B1 | 6/2004 | van Wijk | 340/505 |
| 6,822,582 B2 | 11/2004 | Voeller et al. | 340/933 |
| 6,950,829 B2 * | 9/2005 | Schlabach et al. | 707/104.1 |
| 7,183,924 B1 * | 2/2007 | Ku | 340/572.1 |
| 2002/0185532 A1 | 12/2002 | Berquist et al. | 235/385 |
| 2003/0040826 A1 | 2/2003 | Hawman et al. | 700/116 |
| 2003/0220711 A1 | 11/2003 | Allen | 700/215 |
| 2004/0024501 A1 | 2/2004 | Muehl et al. | 701/29 |
| 2004/0150525 A1 | 8/2004 | Wilson et al. | 340/572.1 |
| 2004/0164140 A1 | 8/2004 | Voeller et al. | 235/375 |
| 2004/0193438 A1 | 9/2004 | Stashluk et al. | 705/1 |
| 2005/0060165 A1 | 3/2005 | Scott et al. | 705/1 |
| 2005/0073435 A1 | 4/2005 | Voeller et al. | 340/933 |

* cited by examiner

*Primary Examiner*—Hung Nguyen
(74) *Attorney, Agent, or Firm*—Pillsbury Winthrop Shaw Pittman, LLP

(57) ABSTRACT

The invention relates to a method and system for tracking repairs or servicing of various products/devices at a service center using Radio Frequency Identification (RFID) tags that are attached to the product upon receipt at the service center and that remain on the product for use in subsequent repairs and servicing. Technicians may record symptoms, repairs made, quality control information, and/or other data (while the product is in their possession) into a service database. This information may then be transmitted to the attached RFID tag. Technician workstations may include transmitters. Information regarding status of repairs may be shared with the customer via user interface applications. Thus, the customer can know the repair status of their product.

20 Claims, 20 Drawing Sheets

| | | | | | | | | | | |
|---|---|---|---|---|---|---|---|---|---|---|
| Home | RMA | Search | Receive | Service | Reports | maintenance | Tasks | batch | Inventory | |

Create RMA

| | |
|---|---|
| Create RMA | Create |
| Search RMA by Number | [ ] Search |

| | |
|---|---|
| RMA Number | 60072873 |
| RMA Date | 4/21/2005 |
| Customer Code | 09822 |
| Customer Name | Test RMA |
| Service Type | RMA Return |

| | |
|---|---|
| Item Name | LCD1770NXM-R |
| Serial Number | SAG6332082 |
| Return Sympton | M13 - Unstable picture |

Add Line Item

| Line | Item Name | Serial Number | Return Sympton | |
|---|---|---|---|---|
| 1 | LCD1760V-R | SAG8700945 | M04 | Delete |
| 2 | AS70-R | SAG6648632 | M11 | Delete |
| 3 | FE990-BK-R | SAG6629132 | M20 | Delete |
| 4 | LCD1960NX-BK-R | SAG6812082 | M02 | Delete |
| 5 | LCD1770NXM-R | SAG6332082 | M13 | Delete |

FIG. 5

| Home | RMA | RMA(public) Search | Receive | Service | Reports |

Receiving

| Serial Number | | Search |
| | ☐ Includes Received Units | |
| | Read(Registered) EDID | |

| RMA Number | Model Number | Serial Number |

FIG. 10A

Receiving

| Serial Number | 1150991YE | Search |
| | ☐ Includes Received Units | |
| | Read(Registered) EDID | |

FIG. 10B

| Serial Number | 1150991YE | | Search | |
| | ☐ Includes Received Units | | | |
| | Read(Registered) EDID | | | |

| RMA Number | Model Number | Serial Number | Tracking Number | Carrier |
|---|---|---|---|---|
| 60072885 | DPLUS230FB | 1150991YE | 8761092 | UPS Ne |
| Comment(Past) | | | | |
| Comment(Add) | | | | |

| Save as Received | Print Traveler | Set Receiving Info to RFID |
| 1004904 | M20 | |

FIG. 10C

Item Number: LCD1760NX-R
LCD1760NX-R
Serial Number: MWC8879170A
MWC8879170A
Current Status Received
RECEIVED
| | |
|---|---|
| RMA Number: | 60072872 |
| Customer: | Yousuke Abe |
| Received By: | Admin |
| Received Date: | 4/19/2005 3:41:38 PM |
FRONT
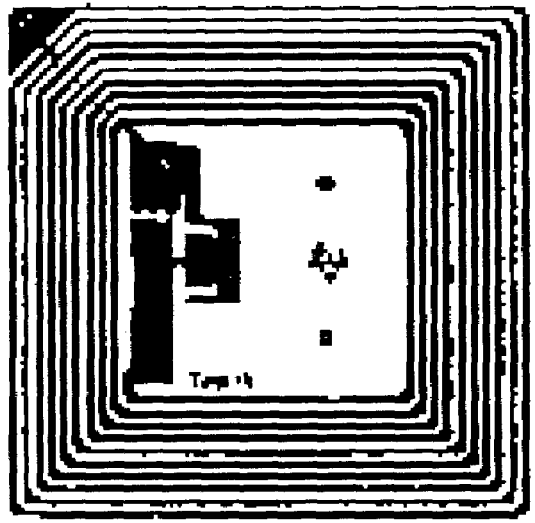
BACK
FIG. 13

Mitsubishi Warehouse California New Service Center System - Technician Preview, 2005/05/19

| Home | RMA | RMA(public) Search | Receive | Service | Reports | maintenance | Tasks | batch |

Service Work Order Number : 93337    [ Search/Refresh ]  [ Get RFID Info ]  [ RePrint Traveler ]

| Current Status | RMA Number | Return Sympton | Model Name |
|---|---|---|---|
|  |  |  |  |

☐ Use Test panel     ☐ Use Repair Panel     ☐ Use QC Panel     ☐ Use Pack Panel

FIG. 16a

Mitsubishi Warehouse California New Service Center System - Technician Preview, 2005/05/19

| Home | RMA | RMA(public) Search | Receive | Service | Reports | maintenance | Tasks | batch |

Service Work Order Number : 93337    [ Search/Refresh ]  [ Get RFID Info ]  [ RePrint Traveler ]

| Current Status | RMA Number | Return Sympton | Model Name | Serial Number |
|---|---|---|---|---|
| InTest | 60072686 | M20 | LCD2060NK-BK-R | 4510447 2QA |

☑ Use Test panel     ☐ Use Repair Panel     ☐ Use QC Panel     ☐ Use Pack Panel

| Test_Date | Test_User | Actual_Code | Actuar_Symp | Actual_Desc |
|---|---|---|---|---|
| 5/24/2005 2:01:5( | Admin | NEC-S2 - No Picture | No Picture | Does not come on, no image, etc. Status light |

[ Finish Testing ]

General Information

| | |
|---|---|
| Service Center | MWC |
| Model Name | LCD2060NK-BK-R |
| Serial Number | 45104472QA |
| Repair Date | 5/24/2005 2: |
| Work Order | 93337 |
| Clock 1 | 876 |
| Clock 2 | 498 |
| Revision | 3A |

Stock Type: InQC

EDID Information

| | |
|---|---|
| ID Manufacturer | |
| ID Product | |
| ID Serial | |
| Week of Manufacture | |
| Year of Manufacture | |

Repair Information

Customer: 20   Actual Code: 2   Test Code: 6
LCD Serial: 98YS65983AX   Vendor:

| | LOC | CODE | Parts name |
|---|---|---|---|
| 1 | LCD | 6 | 3A87301YR |
| 2 | | | |
| 3 | | | |
| 4 | | | |
| 5 | | | |

Comment: Replace LCD

FIG. 20

SYSTEM AND METHOD FOR MANAGING DATA ON AN RFID TAG ASSOCIATED WITH A PRODUCT

FIELD OF INVENTION

The invention relates generally to a method and system for managing electronic maintenance records using Radio Frequency Identification (RFID) tags associated with products undergoing servicing at a servicing facility. In particular, a computerized method and system allows service facilities to securely create, update, share, and store data using the RFID tag and a storage component.

BACKGROUND OF THE INVENTION

Generally, products received for repairs at a service facility are first diagnosed by technicians to identify the problem(s). This usually requires initial testing in order to accurately identify the problem. Sometimes, the owner may share information regarding previous maintenance work that has been done on the product, before repairs begin. However, complete product history may be hard to come by because previous service records may have been misplaced or thrown away. Additionally, the owner of the product is unlikely to remember or even know the exact nature of previous maintenance work performed on the product. When the product is presented to the repair facility, time and money must be invested to obtain the current status of the product. Even then, not all the needed information may be available.

Additionally, once a product enters a service facility, it is common for the product to go through a series of specialized technicians who handle different aspects of maintenance. Even within the facility, it may be difficult to decipher what tasks have, and have not, been completed from one technician to another due to inefficient recordkeeping. To add to the problem, the owner of the product is usually told that repairs can take, for example, up to 6-8 weeks after the product is received. During this time the owner has no information as to the status of their maintenance request.

Some service facilities have been known to use the barcode mechanism to identify products. Barcodes, however, are limited in the information they provide and are incapable in physically tracking the product. Another disadvantage presented by barcodes is that they must be physically scanned using a barcode scanner, and the resulting number provides limited standardized information. Furthermore, barcodes may be easily destroyed or damaged, preventing scanning and/or reading.

Radio Frequency Identifiers (RFIDs) on the other hand, allow a product to be tracked using RFID tags associated with the product or object. The information held by an RFID tag may be more extensive than a barcode. RFID tags work in combination with RFID transceivers which can exchange data with the RFID tag via wireless radio communications. This allows the RFID tag to be placed anywhere on the product, including hard to reach places.

There are typically two types of RFID tags, passive and active. Passive tags do not have a power supply of their own. Therefore, an electrical current supplied by the antenna of an RFID transceiver may activate the tag so that it can begin exchanging data. By virtue of its low power consumption, passive tags usually have a short read range from about 10 mm up to about 6 meters. Active tags, however, have their own power supply and may have a longer read range, but are also larger and more expensive.

In the past, RFID tags have been used for example, in automotive vehicle service systems. For instance, an RFID tag attached to a tire may provide a trained mechanic information such as, current tire alignment. This system, however, lacks the ability to electronically record servicing in an orderly and efficient manner while at the same time sharing the most current servicing information with the vehicle owner.

Accordingly, a need remains for a system and method that can accurately and efficiently record and store maintenance procedures being performed at a remote servicing facility and share this information with the owner, while reducing the cost and time spent on performing the actual maintenance. It would also be beneficial to have repair history readily available with the product, in order to save time on initial testing and diagnosis.

SUMMARY OF THE INVENTION

The present invention is directed to a method that satisfies this need. One aspect of the invention includes a computer implemented method for receiving and authorizing a customer's product servicing request to a service center system; creating an electronic record for the request in both the service center system database and the RFID tag; associating the RFID tag with the product requiring servicing; and updating the electronic record in both the service center system database and the RFID tag with servicing data.

Thus, as repairs are completed, both the database and the RFID tag are updated with the most current repair status. The customer may access status records stored at service database via customer interface application over electronic network connection.

BRIEF DESCRIPTION OF THE DRAWINGS

These and other features, aspects and advantages of the present invention will become better understood with reference to the following description, appended claims, and accompanying drawings where:

FIG. 5 shows screen shot for RMA entry, according to an embodiment of the invention.

FIGS. 10a, 10b, and 10c, show screen shots for receiving a product, according to an embodiment of the invention.

FIG. 13 shows the front and back of a sample RFID tag, according to an embodiment of the invention.

FIG. 16a shows a screen shot for the service task described in FIG. 14, according to an embodiment of the invention.

FIG. 16b shows a screen shot for the test panel in the service task described in FIG. 14, according to an embodiment of the invention.

FIG. 17 shows a screen shot for the repair panel in the service task described in FIG. 14, according to an embodiment of the invention.

FIG. 18 show a screen shot for the quality control panel in the service task described in FIG. 14, according to an embodiment of the invention.

FIG. 19 shows a partial screen shot for the RFID application while the product is in repair, as described in FIG. 14, according to an embodiment of the invention.

FIG. 20 shows a partial screen shot of the RFID application while the product is in quality control as described in FIG. 14, according to an embodiment of the invention.

DETAILED DESCRIPTION

In the following description, for the purpose of explanation, specific details are set forth in order to provide a thorough understanding of the invention. The description illustrates the invention by way of example and not by way of limitation. It will be apparent that the invention may be practiced without these specific details and examples. In other instances, well-known structures and devices are depicting in block diagram form in order to avoid unnecessarily obscuring the invention.

Figure 1:
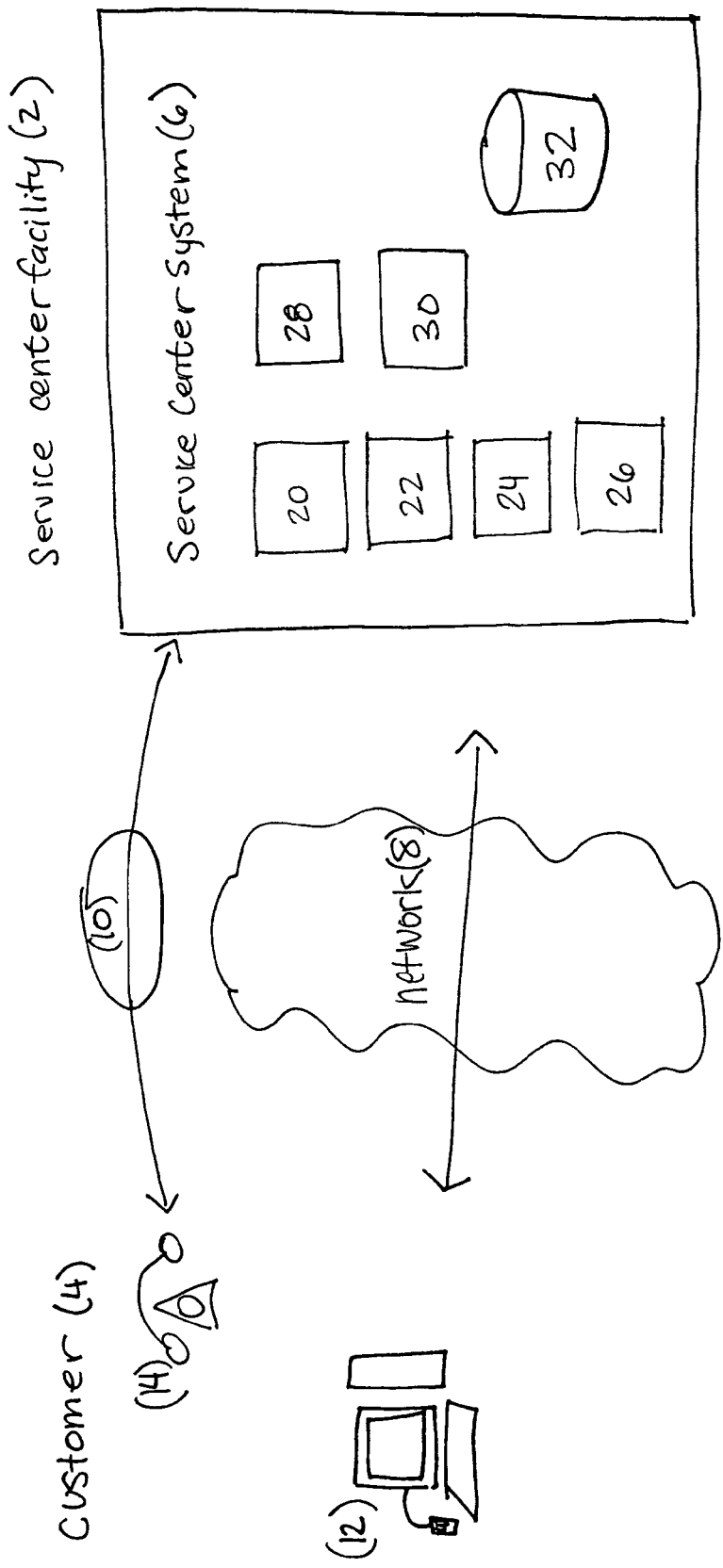
FIG. 1 shows a network configured between a customer and service center facility according to an embodiment of the invention.

Hardware Overview:

FIG. 1 shows a network configured between a customer and service center facility, according to an embodiment of the invention. The present invention operates in conjunction with a service center facility 2 and remote customer(s) 4. The customer may be the owner of a product needing maintenance work from a servicing facility. The service center facility 2 comprises a service center system 6 connected to an information network 8 and/or telephone network 10.

As indicated in FIG. 1, the present invention provides a customer 12 with the capability of communicating with service center facility 2. In one embodiment customer 12 communicates with the service center system 6 via a typical telephone network 10. Such telephone networks are known to transmit and receive both voice and data, locally and over long distances. Other means for employing the telephone network are included, but not limited to, fiber optic, radio signal, satellite, etc.

Alternatively, FIG. 1 shows the customer 4 using a personal computer 12 to achieve such communications. The computer may be any general use computer or computing device having power-supply, CPU, main-storage, I/O resources, communication interface, and user interface including keyboard and mouse. The customer may communicate over a communications data network 8 with service center facility 2 using the personal computer 12 via normal means including, but not limited to, either modem, telephone line, cable, fiber optic connection, etc. The communications data network 8, may include, but not limited to, either Internet, WAN, LAN, etc.

The customer computer 12 is controlled by suitable software, including network communication and browser software to allow a user to request, receive, and display information from a service center system 6. In one embodiment, the user computer employs a program, such as a browser for connecting to service center system 6. Typical browsers, include a variety of user operable functions that facilitate the user's control of their communication path through a network, to control the user's access to content available on the network.

The service center facility 2 comprises at least one station for each of a number of tasks to be conducted at the service center facility 2 during product servicing. As depicted FIG. 1, service center facility 2 may include a call center station 20, receiving station 22, testing station 24, repairing station 26, quality control station 28, and shipping station 30. Optionally, other tasks such as accounting, manufacturing, and inventory may be included. It will be appreciated that two or more tasks may be combined at a single station in order to conserve resources. For example, the receiving and shipping stations may be combined to form a single mailroom station, while testing 24, repair 26 and quality control 28 may be combined to form a single servicing station. Each station 20, 22, 24, 26, 28, 30 may also include, but not limited to, diagnostic, testing, communications, monitoring, and safety equipment along with tools (e.g., screwdriver, wrench, drill, etc.), that may be required for each task to be preformed by a technician at a respective station. Stations and station features are adaptable to the changing needs and nature of a business facility.

Figure 2:
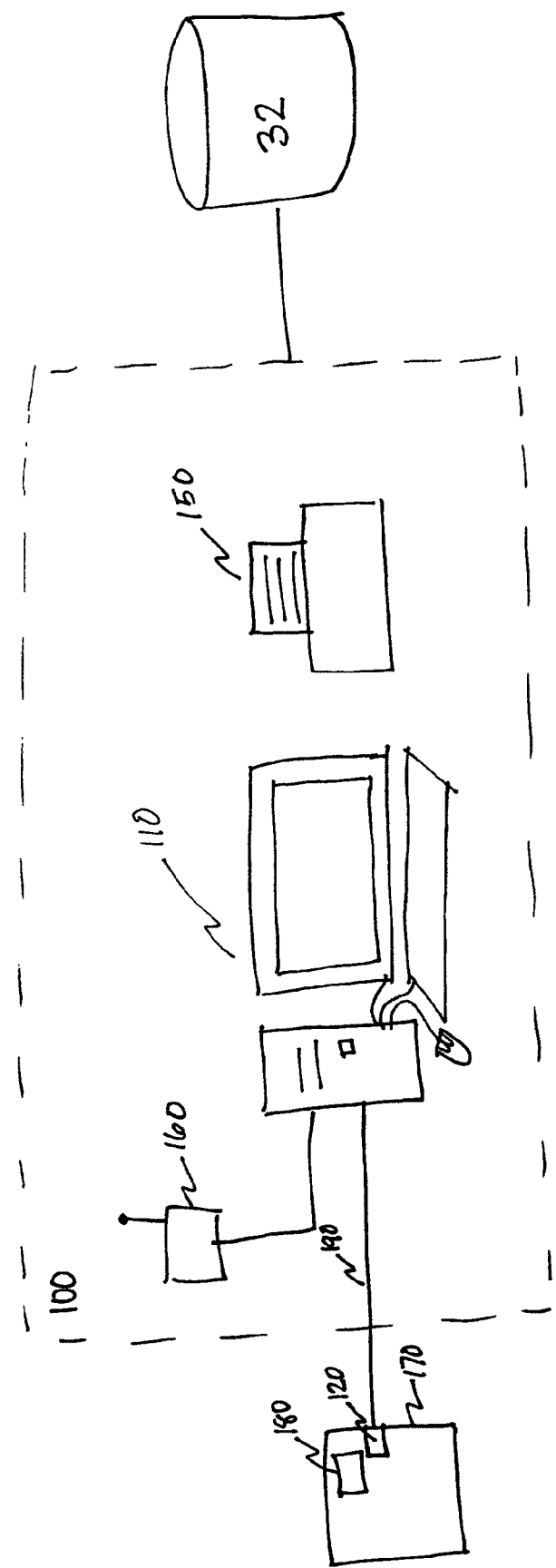
FIG. 2 shows a computer as it would appear at each station within the service center facility of FIG. 1, according to an embodiment of the invention.

FIG. 2 shows computer as it would appear at each station within the service center facility of FIG. 1, according to an embodiment of the invention. In order to electronically record actions taken in each task, each station generally represented as reference numeral 100, comprises at least one computer system 110 comprising CPU, main-storage, I/O resources/ports, communication interface, communication ports, and user interface including keyboard and mouse. Although only one station computer is illustrated, it is understood that each station may comprise more than one computer 110. For purposes of explanation, FIG. 2 can represent each station (20, 22, 24, 26, 28, 30), in order to describe the functions performed at each respective station. In preferred embodiments, the computer comprises a programmable processor capable of operating in accordance with programs stored on one or more computer readable media (for example, but not limited to, floppy disks, hard disks, random access memory RAM, CD-ROM). The computer 110 located at the station 100 allows technicians to electronically record the servicing and/or repairs being conducted on a product 170 that has entered the facility 2 and that is currently located at the technician's station 100. Alternatively, the station 100 may comprise laptop or portable hand held computer to allow station mobility within the service center facility 2.

Each computer 110 has the option to be directly linked to a printer 150. Alternatively, the computer 110 may be connected to a network printer located within the facility 2. The printer 150 can be supplied with RFID labels. The Printer(s) can print and encode data into passive RFID tags embedded in the labels. This will be discussed later in further detail.

As depicted in FIG. 2, product 170 received at the service facility 2 is affixed with an RFID tag 180. Each computer 110 at the station 100 is equipped with an RFID transceiver having antenna and decoder for reading and writing data to an RFID tag or transponder. RFID transceiver may be implemented as an integrated microchip within the computers, laptop, or hand held device's processor. Alternatively, an RFID transceiver may be connected via communications port to the computer.

As an example, FIG. 2 shows an external RFID transceiver 160. Data can be exchanged via wireless communications link between RFID tag 180 and the computer's RFID transceiver 160. The radio waves that are sent back and forth between the RFID tag 180 and transceiver 160 contain the data in the tag, and this data may then be converted by the transceiver 160 and transferred into a computer system 110 to be ultimately stored at service center database 32. Conversely, data, including data from service center database 32, may be encoded into the RFID tag 180 via the same means. A passive RFID tag 180 may be located anywhere on or within a product 170. Thus, the product 170 need only be within a certain short range distance from the station's transceiver 160 for data to be automatically exchanged with the RFID tag 180.

The station computer 110 is communicatively coupled to service center database 32. The service center database 32 enables electronic records to be securely stored at the service center facility 2. As disclosed above, the data sent back and forth between the RFID tag 180 and transceiver 160 are stored in the service center database 32. The following examples are illustrative various types of data which may be stored at the service center database 32. The examples are not intended to be limiting, and a person of ordinary skill in the art will recognize that the service center database 32 is capable of storing many types of data that are useful to a service center facility 2. Stored data may include, but not limited, product serial numbers, model numbers, return reports, customer information, warranty information, re-call information, testing information, repair information, spare parts inventory, status reports, shipping/receiving information and accounting information. This in no means is an exhaustive list of data that may be stored at the service database.

General Description of Embodiments:

The method according to the present invention for creating an electronic maintenance record includes at least the tasks for (1) authorizing a customer's request to return a product for servicing; (2) receiving the product at the service center facility for servicing; (3) servicing the product by testing, repairing and performing quality control; and (4) shipping the product back to the customer after completion of servicing.

Figure 3:
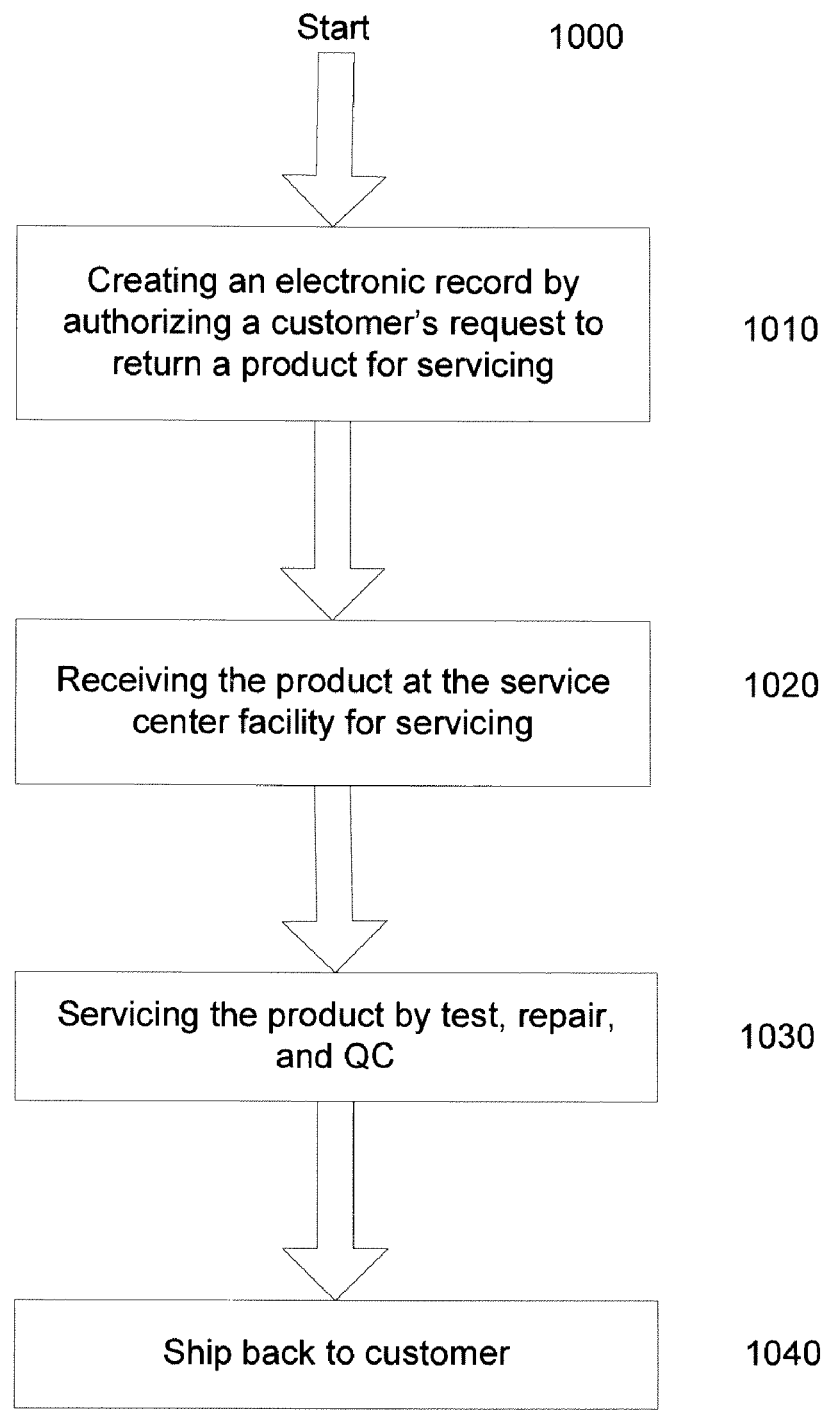
FIG. 3 shows a flowchart illustrating a method of creating electronic maintenance record, according to the present invention.

FIG. 3 illustrates main process 1000 configured to create an electronic maintenance record in accordance with the present invention. In one embodiment, the network shown in FIG. 1 is configured to perform the process 1000. Main process 1000, begins at step 1010, where a technician is tasked to authorize a customer's repair request, which may be performed at station 20 of service center facility 2. Upon completion of authorization, a valid electronic return record (e.g., Return Material Authorization) is created and stored for the first time at the service center database 32.

In step 1020, the product in need of repair is received from the customer, where it is recorded into the service center database 32, and attached with a printed RFID tag encoded with the previously created RMA data. These tasks may be performed at receiving station 22 of service center facility 2. Receiving the product includes various aspects, to be described in further detail below. The received product may then be sent to the servicing station(s) (24, 26, 28)

In step 1030, servicing work on the product begins by first reading and recording to the attached RFID tag. The tag may be updated with test, repair, and quality control information entered by technician(s) during servicing. After completion of all maintenance work (e.g., test, repair, QC), the product is sent back to the customer, as indicated in step 1040. Each step of main process 1000 as depicted in FIG. 3 is further detailed in reference to software applications running on each station.

Each station (20, 22, 24, 26, 28, 30) may be controlled by a suitable set of software applications that enable each task in steps 1010, 1020, and 1030 to be performed. The software installed on the computer 110 at each station enables communications with the service center database 32, RFID tag 180, and customers 4. This software includes Service Center Application, Service Tool, RFID Application, and Internet. Each software application will be discussed in greater detail below with reference to each task of main process 1000.

At the authorization task of main process 1000 (step 1010), a customer 4 desiring to initiate the process to repair or service a defective product may call service center system 6 via telephone network 10, discussed above, in order to submit data relating to the customer's product and repair request. By way of example these products may include, LCD monitors, computer hardware, I/O devices, peripheral devices, televisions, house hold appliances, telecommunications hardware, chip boards, PC boards, cameras, phones, etc. A call center technician at call center station 20 equipped with station computer 110, described above, may collect and create a new electronic record in the service center database 32 from the customer's 4 request for product repair.

Figure 4:
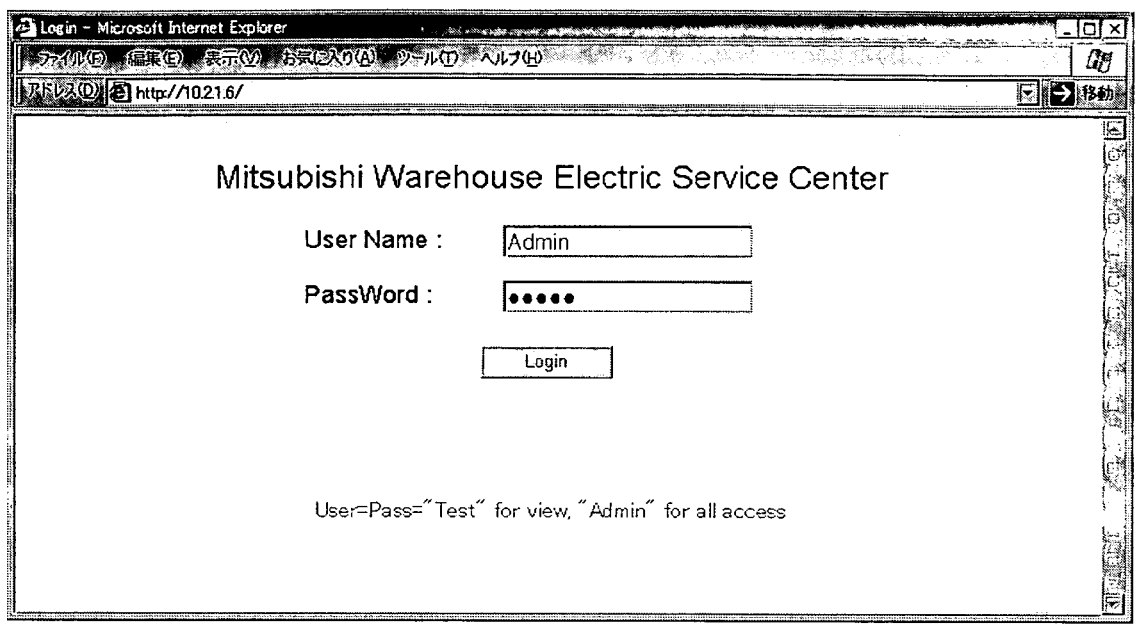
FIG. 4 shows screen shot for Service Center Application login, according to an embodiment of the invention.

Using the service center application to communicate with the service center database 32, the call center technician may be required to login via screen shown in FIG. 4, in accordance with an embodiment of the present invention. FIG. 4 shows a screen shot for service center application login, according to an embodiment of the invention. The Service Center Application login screen may be used by members wanting access to the service center database 32. Service Center Application is software configured to interface with service center database 32. After correctly logging into a Service Center Application as shown in FIG. 4, the call center operator is given access to areas of the Service Center Application which allow the call center operator to complete the assigned task of authorizing a customer's return request.

FIG. 5 shows various tabs 200 for navigating the Service Center Application. Using the Service Center Application running on the computer 110, the operator may begin to create an electronic record including the repair(s) requested, serial number(s), and product model number(s) collected from the customer during the call by using the Request Material Authorization (RMA) screen illustrated in FIG. 5. This screen is used by the call center technician to create and store RMA data in a service center database 32 according to the form data 220. The search RMA by Number feature 240 allows call center operator to retrieve previously created RMAs. Additionally each RMA is not limited by a number of products. For example, a single RMA may comprise two or more line items 260 (e.g., products) needing repair. Thus, multiple products may be associated with a single return record.

In an alternative embodiment, a customer may request return authorization by contacting the service center system 6 via remote computer 12 located at the customer's location. The customer can direct a web browser, on the remote computer 12, to the service center facility's page shown in FIG. 4. Using the service center application, a customer can access RMA entry screen (FIG. 4) using previously established login credentials. The customer requests a repair by filling out the form 220 and submitting it to the service center database 32. The form may include customer code, customer name, item name, serial number, and repairs requested. In order to create and store a valid return request record (e.g. RMA) a technician at the service center authorizes the product and the requested repair(s). Repair authorization can check whether the service center is capable or covers the customer's repair request record. For example, factory defects and re-calls are more easily authorized compared to water damage, customer misuse, and normal wear and tear on a product. Each service facility may establish rules for authorizing repair requests.

Additionally, the return authorization process can also prevent customer fraud. For example, a customer may try to request service on a stolen product or request repairs after product warranty has run out. The authorization step can check whether the product was previously registered by the customer requesting repair and what, if any, corresponding warranty information still apply.

Figure 6:
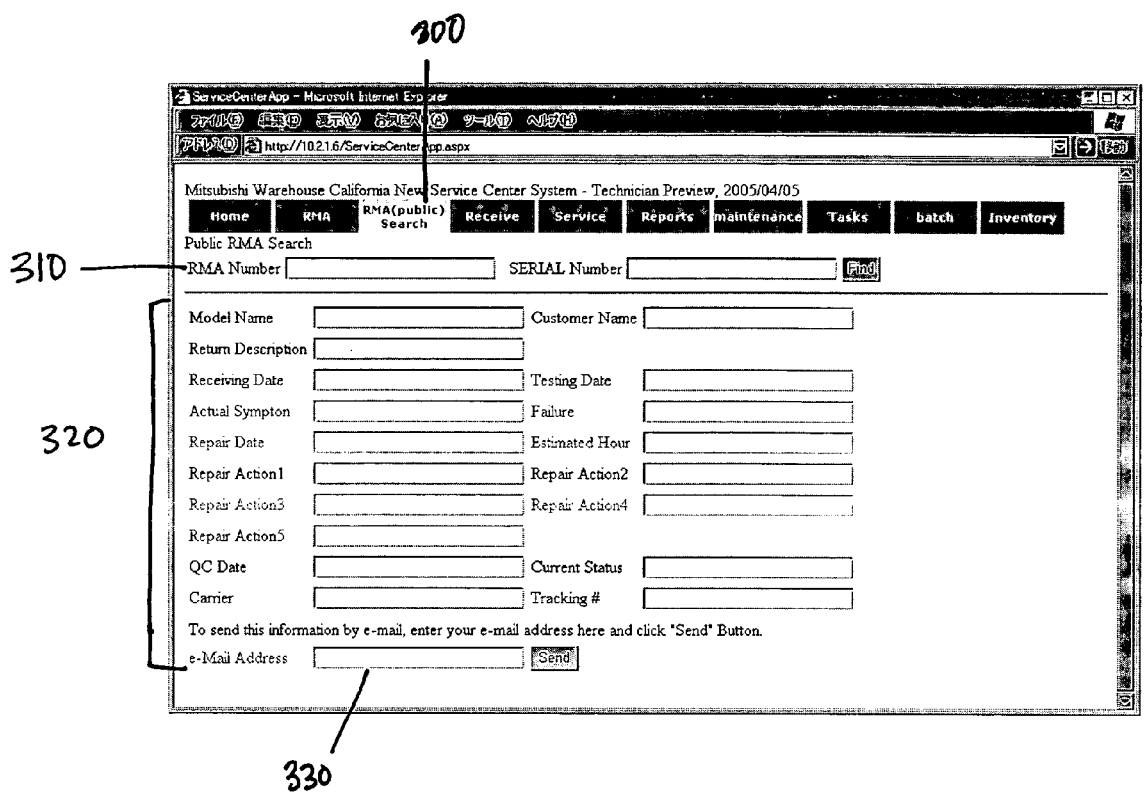
FIG. 6 shows a screen shot for RMA public search, according to an embodiment of the invention.

After a return request has been authorized and a corresponding return request record (e.g., RMA) has been created in the service center database 32, the customer may deliver the product to the service center facility 2, using well known means. Upon shipping and any time thereafter, the customer may search for the RMA and serial number using public search function 300, provided by the service center application. FIG. 6 shows a screen shot for an RMA public search, according to an embodiment of the invention. Search result 320 can include the information shown on the screen in FIG. 5. QC Date refers to quality control date. Current Status refers to status such as Not Received, Received, In Test, In Repair, In QC, and Shipped. Optionally, the customer may enter their e-mail address in a field 330 to receive a copy of the RMA information shown.

Turning to FIG. 3, the next task of main process 1000, receiving a product (step 1020), is further described in greater detail below. The receiving station 22 and the receiving technician create electronic records by running the service center application, service tool, and RFID application on the receiving computer 110. Service center application reads and writes to the RFID tag 180 via RFID application and RFID transceiver 160. The service tool and RFID application are executed to receive a product, further detailed below in reference to FIG. 7.

Figure 7:
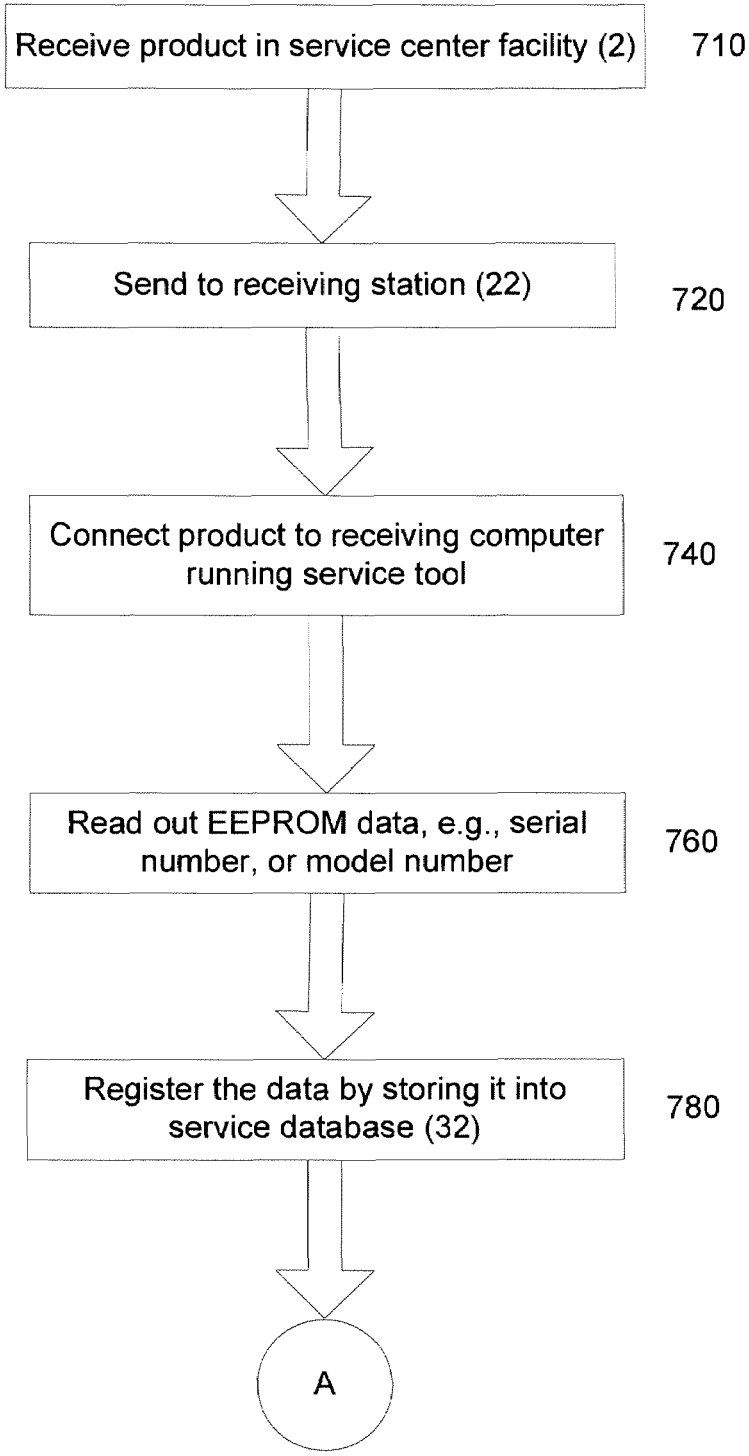
FIG. 7 shows a flowchart illustrating the method for initially receiving a product, according to an embodiment of the invention.

FIG. 7 illustrates a process 700 configured to enable the initial receipt of a product, in accordance with an embodiment of the invention. Process 700 begins at step 710 where, after the product is received at a product service center facility, the technician executes the service tool to connect and extract EEPROM data from the received product. The service tool is a separate software application used to extract data from a newly received product that does not have an RFID tag. The service tool is run one time for a single product in order to extract information from the product's hardware and store it into the service center database 32. Ultimately, the extracted data is used to find a corresponding RMA for the product but before that, in step 740, a communication cable 190 is used to physically couple the newly received product to a receiving computer's communication port. Various types of communication cables can include parallel cable, serial cable, RS-232 cable, VGA cable, DVI cable, etc.

Products such as computer hardware, televisions, and various other electronic products have data embedded in an electrically erasable programmable read-only memory also known as EEPROM shown as item 120 in FIG. 2. The data stored on an EEPROM 120 may include identification information (e.g., serial number) entered during manufacturing of the product. EEPROM 120 can also store factory settings, firmware version, manufacturing data, and model information. This in no means is an exhaustive list of information that can be stored in an EEPROM 120. In an example for manufacturing computer monitors, VESA standards require each monitor contain Extended Display Identification Data (EDID) which can be stored on an EEPROM 120. The EDID uses a string of characters to describe the monitor capabilities, including vendor information, maximum image size, color characteristics, factory pre-set timings, frequency range limits, and character strings for the monitor name and serial number.

Figure 8A:
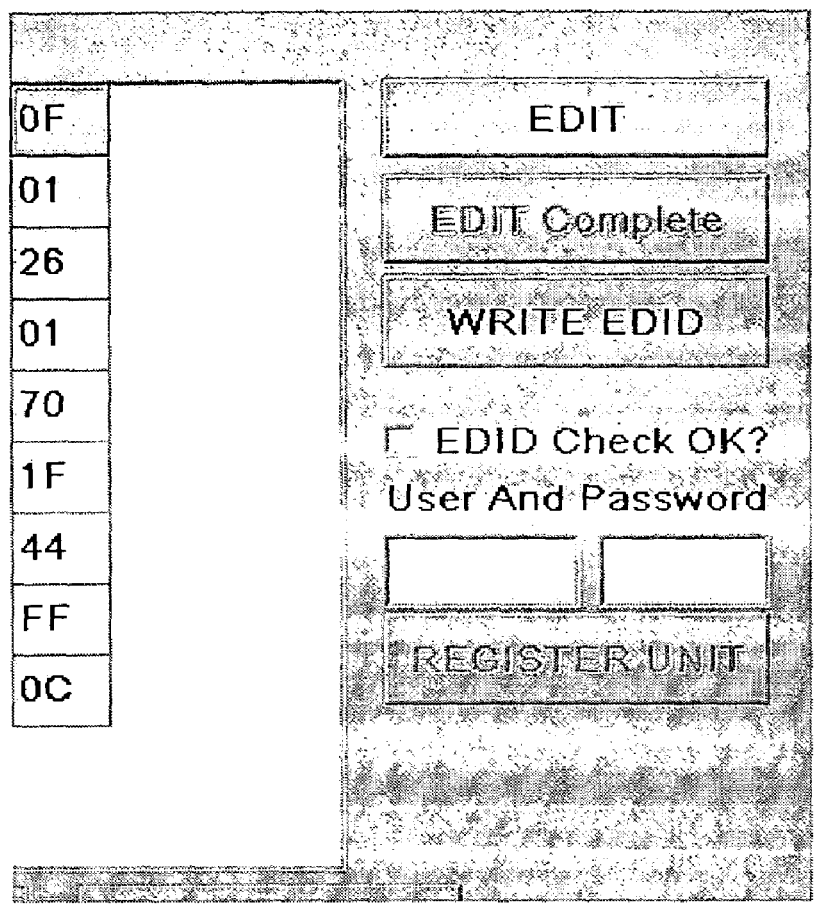
FIGS. 8a and 8b, show screen shots involved in the method of FIG. 7, wherein the receiving station's computer runs a service tool, according to an embodiment of the invention.
Figure 8B:
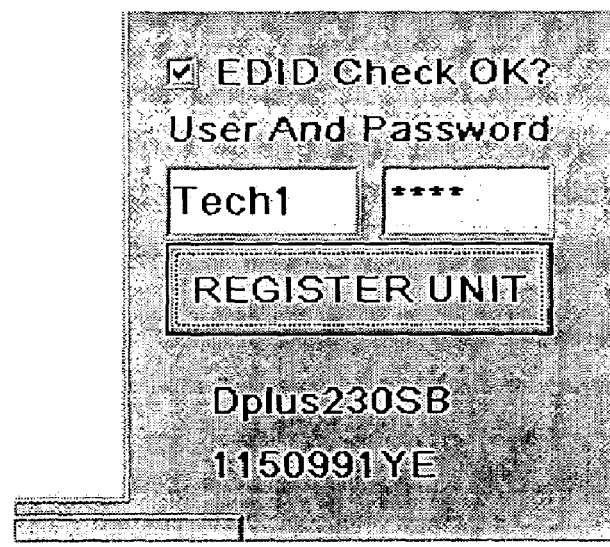

The communication cable 190 enables the transfer of product identification data stored in the EEPROM 120 to the service tool running on the computer 110, in step 760. FIGS. 8a and 8b, show screen shots for a service tool running at the receiving station's computer, according to an embodiment of the invention. The receiving technician ensures the transfer of identification data from EEPROM was successful. If so, the product identification data is registered, in step 780, meaning that the EEPROM identification data is stored into the service center database 32. If transfer was unsuccessful, the service tool is run again until a successful extraction is complete. Therefore, the communication cable allows the automatic retrieval of product identity, without having the technician to manually find and enter it.

Still within the receiving task of main process 1000, the receiving computer creates an RFID tag for the product. A receiving computer runs the service center application to retrieve the registered product identification (e.g., EEPROM data) from the service center database 32.

Figure 9:
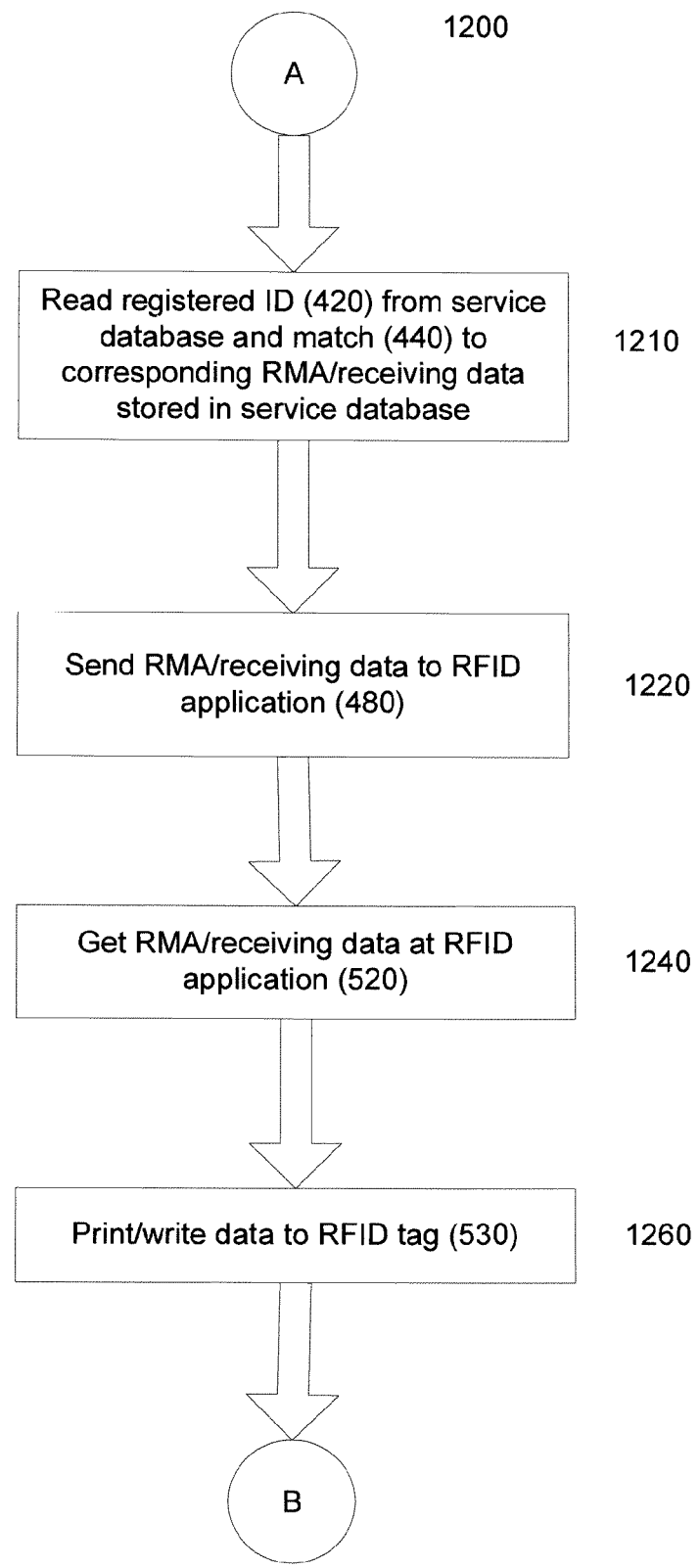
FIG. 9 shows a flowchart for writing a new RFID tag, according to an embodiment of the invention.

FIG. 9 illustrates process 1200 configured to provide the flowchart for writing of a new RFID tag in accordance with an embodiment of the present invention. The computer system of FIG. 2 may perform process 1200.

Process 1200 commences with step 1210, where the service center application allows a registered product identification (e.g., EEPROM) to be matched with the previously created RMA and receiving data stored in service center database 32. The service center application sends the electronic record (e.g., registered ID, RMA, receive data) to the RFID application, in step 1220. The RFID application retrieves the send data in step 1240 and the technician may now print an RFID tag encoded with the sent data, and associate it with the product, according to step 1260.

By way of example, FIGS. 10a, 10b, and 10c, show screen shots for receiving a product, according to an embodiment of the invention. At the receive screen 400, the receiving technician clicks a Read Registered ID button. 420 to retrieve the serial number registered by the service tool and stored in the service data base 32. Technically, although the product has entered the service center facility 2, it is not yet classified as a received unit. For product(s) to be considered a verified received unit, a matching electronic record have return request (e.g. RMA) for the product must be located within the service center database 32. By selecting the search button 440, the product identification (e.g., serial number) is used to find a matching electronic record having repair request (RMA) data that was previously created. As such, the product can be saved 460 as a received product, meanwhile, status of the RMA will change to "Received". The received product is now ready to be associated with an RFID tag (if one is not already present) encoded with the electronic record including status and RMA data. If the newly received product already has an RFID tag, the transceiver located at the receiving computer will detect the data and add any additional information to the tag using the Write Data button 530.

Figure 11:
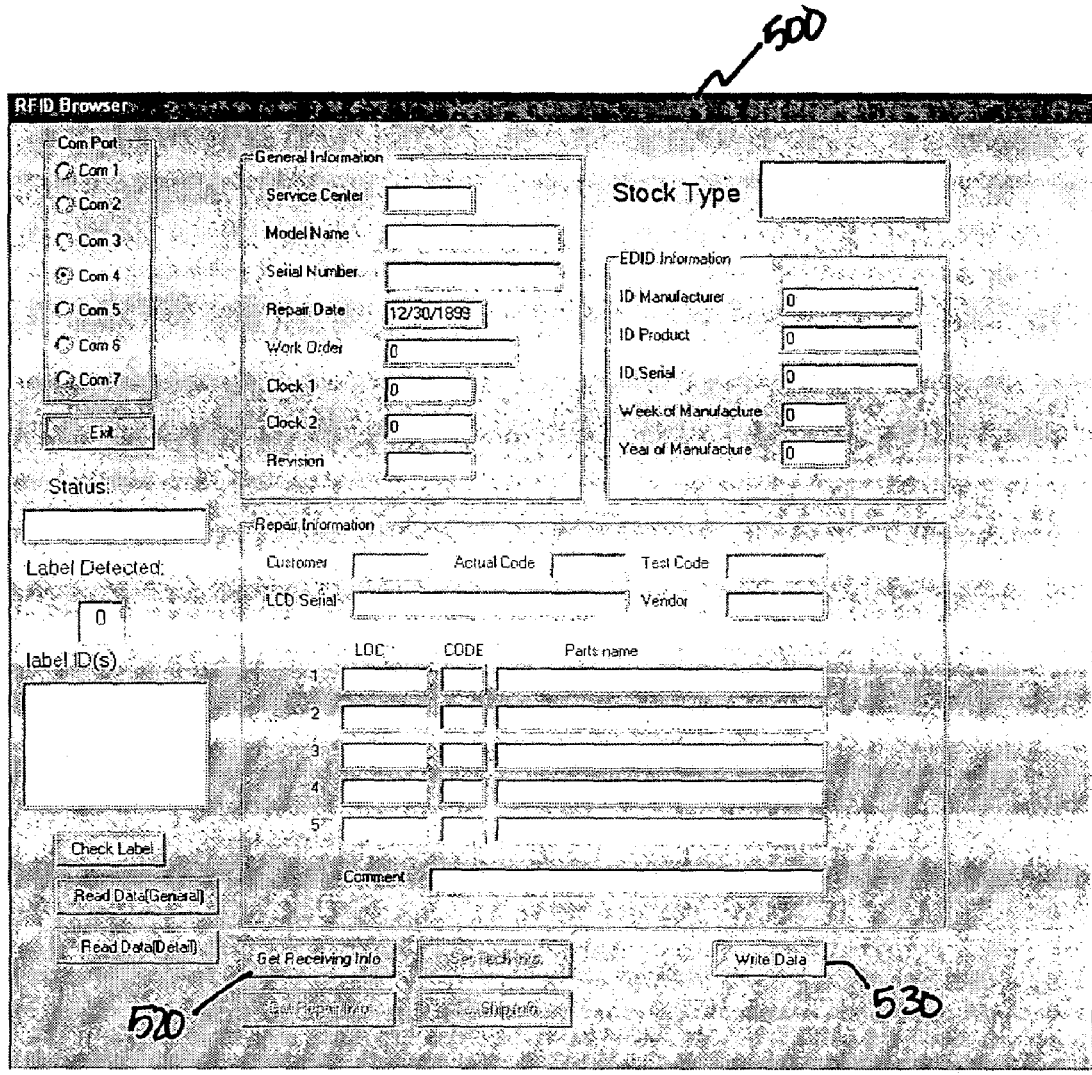
FIG. 11 shows a screen shot for the RFID application running at the receiving station for writing RFID tag as disclosed in FIG. 9, according to an embodiment of the invention.

The tagging process is executed via an RFID application running on the receiving station's computer (22, 110). The receiving task and tagging process is most effectively done one product at a time. This ensures accurate processing and printing of the RFID tags. The receiving technician can select the set RFID button 480 from the service center application which automatically sends a message to initiate the RFID application screen 500. FIG. 11 shows RFID application screen 500, as it is seen from a receiving computer 110. The initial screen allows the receiving computer to select the Get Receiving Info button 520 in order to import the current RMA information from the service center application (FIG. 10*c*).

Figure 12:
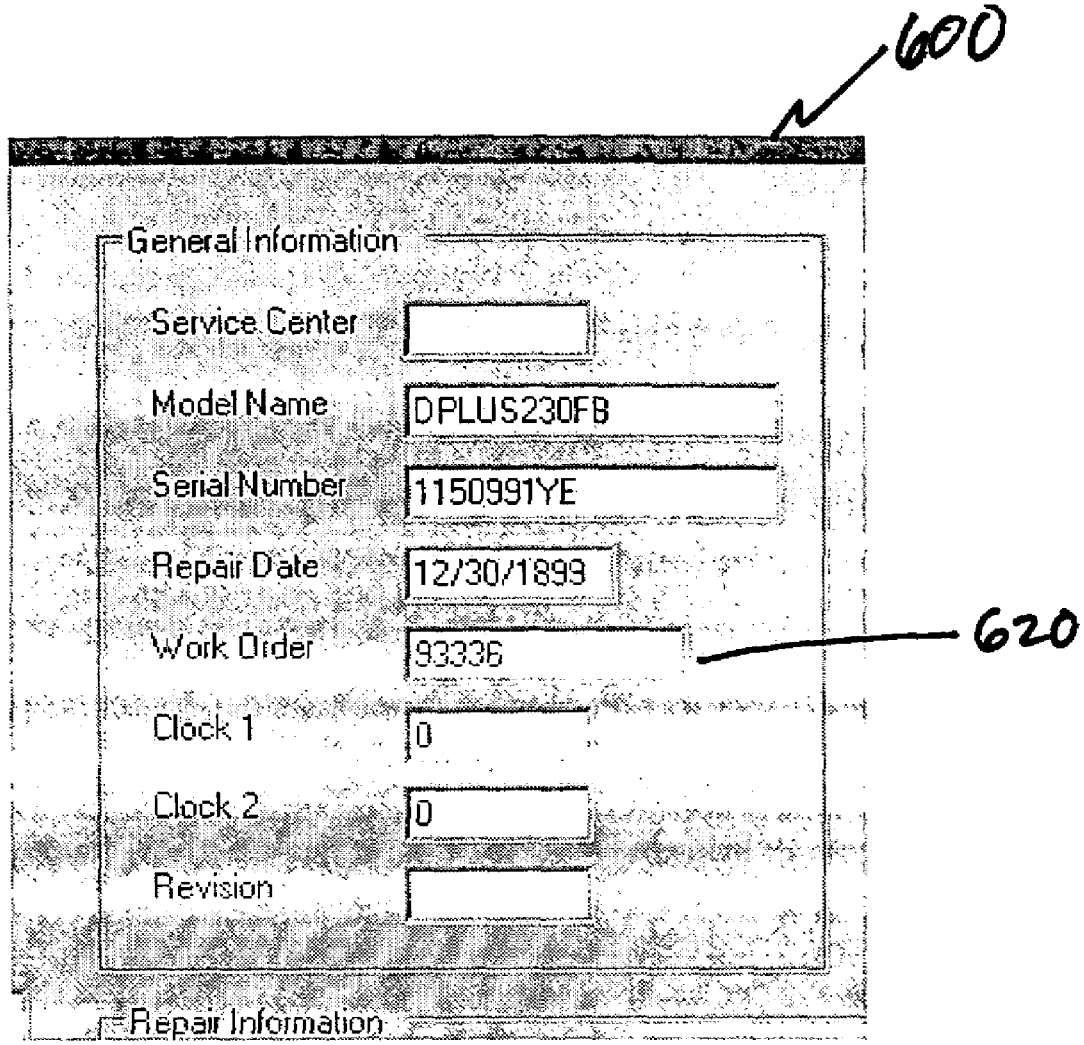
FIG. 12 shows a partial screen shot of FIG. 11, showing the general information loaded into the RFID application, according to an embodiment of the invention.

FIG. 12 shows a partial screen shot of FIG. 11, showing the general information loaded into the RFID application, according to an embodiment of the invention. General information 600 is a result of the Get received info button 520 being selected. Using an RFID printer 150 coupled to the receiving computer 110, the receiving technician may select the write data button 530 to print and encode an RFID label having an RFID tag. The tag is encoded with the electronic record including general information shown in the screen 600.

FIG. 13 shows the front and back view of sample RFID tag, according to an embodiment of the invention. The sample RFID tag 180 printed by printer 150 may be affixed to the product 170 using a sticker or an other means for physically associating a tag with product. The figure is by way of example only. In alternative embodiments, RFID tags may vary in size, color, printed information, etc. RFID tags may also be attached to the product using various different means that are well known in the art. Once an RFID tag is placed on the product, the product is ready to be sent within the service center facility 2 to be serviced according to a work order.

Figure 14:
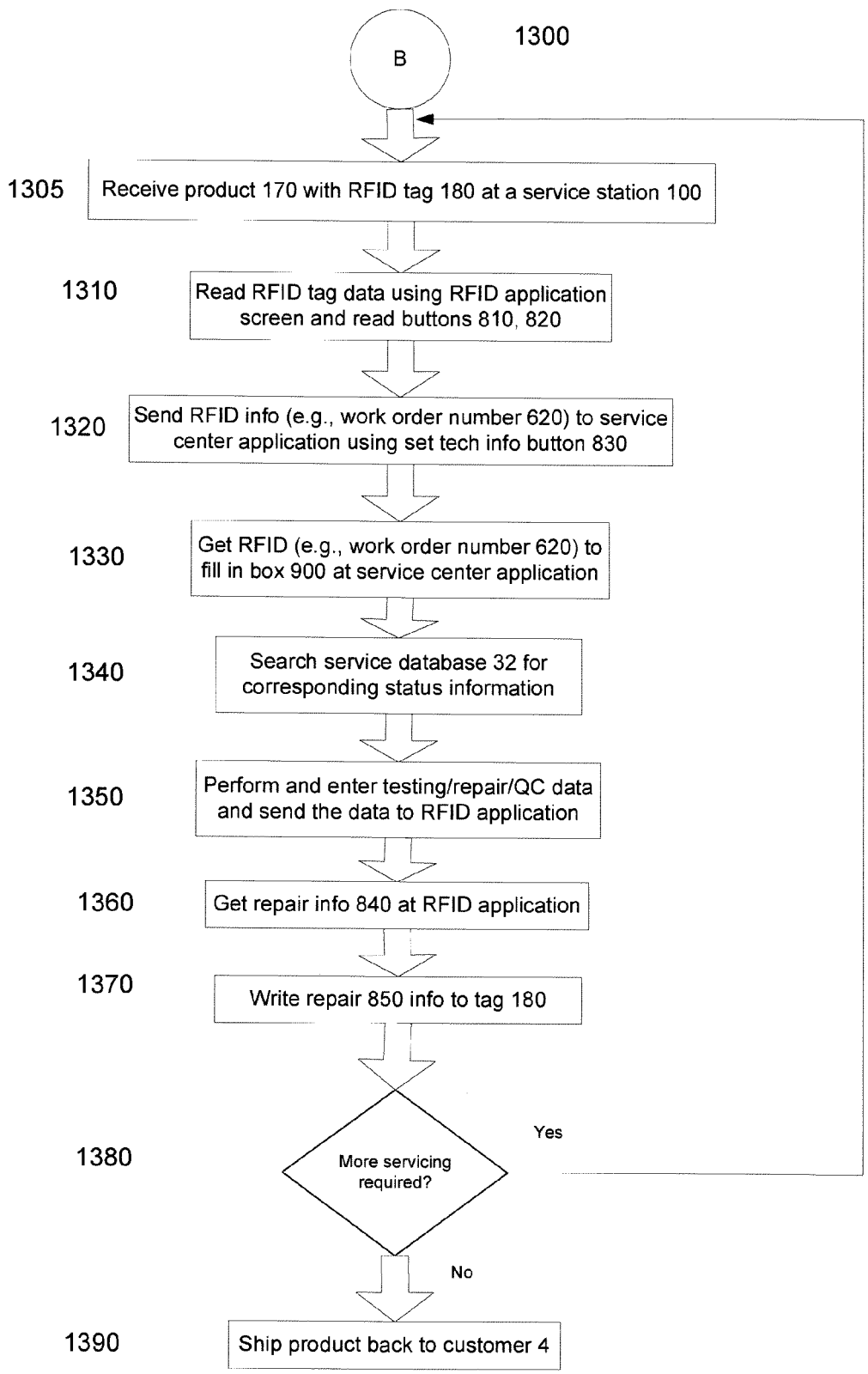
FIG. 14 shows a flowchart for the servicing task within the service facility, according to an embodiment of the invention.
Figure 15:
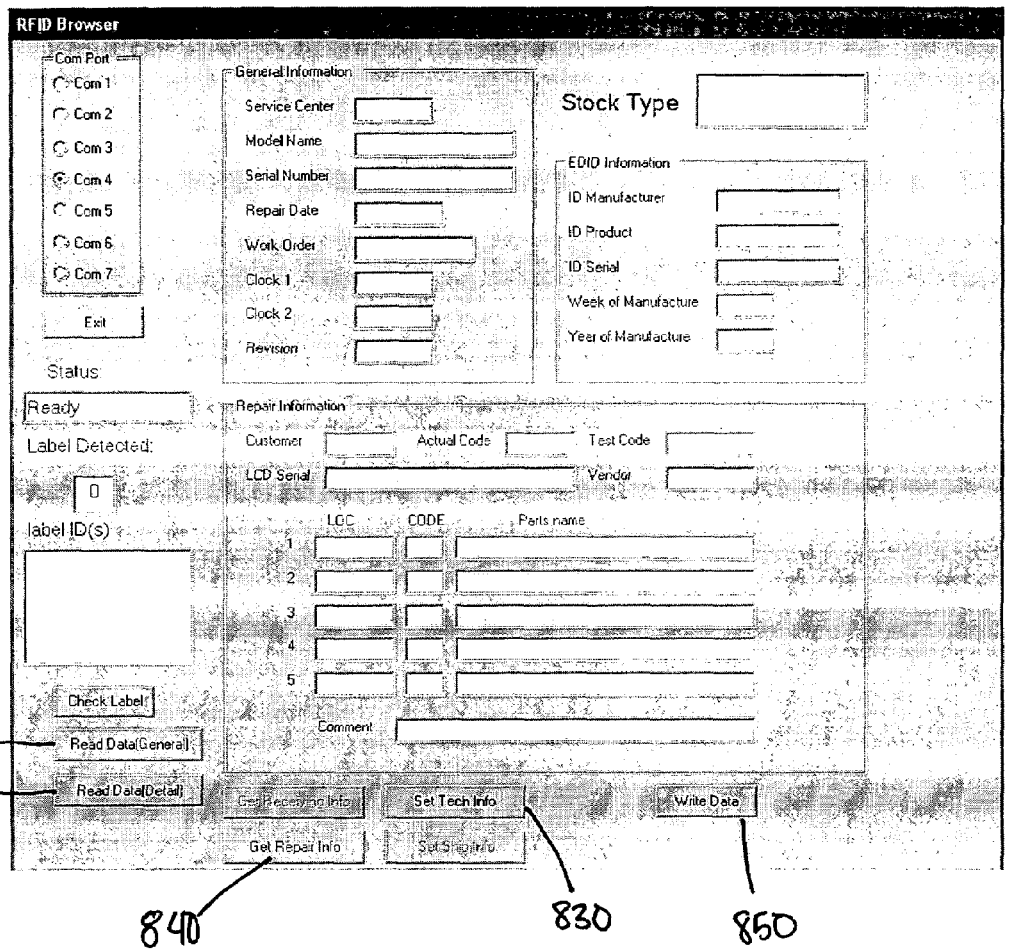
FIG. 15 shows a screen shot for the RFID application running on the servicing station described in FIG. 14, according to an embodiment of the invention.

Now the task for servicing a product of main process 1000 (step 1030) is described in greater detail with reference to FIG. 14. The task for servicing a product may include, testing, repairing, and performing quality control. FIG. 14 depicts process 1300 configured to provide the servicing of a product, in accordance with the present invention. In one embodiment, the computer system of FIG. 2 performs process 1300. Process 1300 starts at step 1305, where the product having an RFID tag 180 is received at a servicing station 100. The RFID tag is read using the RFID application at the servicing computer in step 1310. Next, in step 1320 the Set Tech Info button 830 in the RFID application is selected in order to send the detected data from the RFID tag (e.g., work order number 620) to the service center application.

Figure 17:
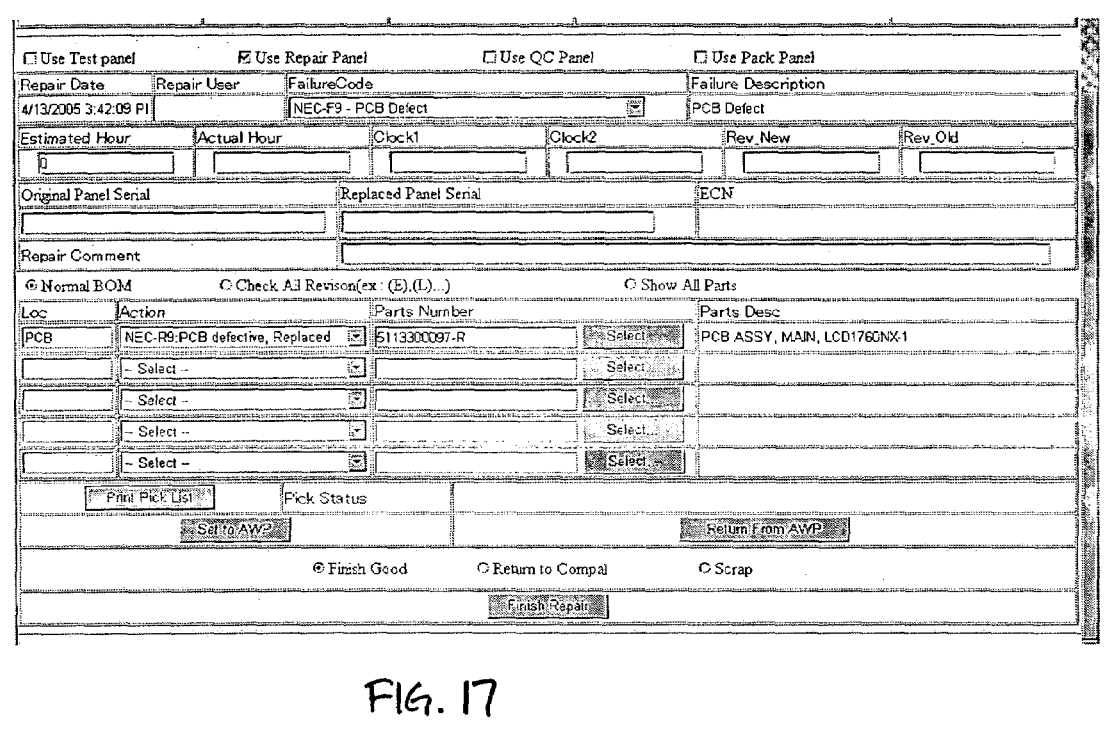
Figure 18:
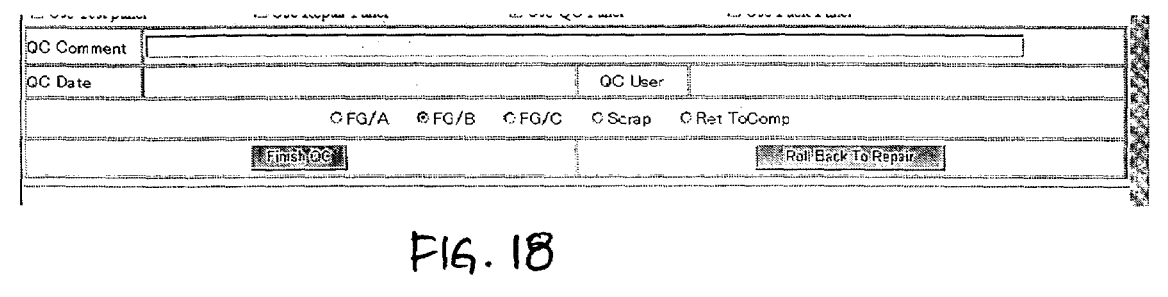

Step 1330 allows servicing station to obtain the sent RFID tag data. The work order number 620 may be searched in the service center database 32 to find current status information. According to current status, either testing, repair, or quality control operation are done on the product. As the technicians complete these operations, data entered into appropriate panels of the servicing screen, shown in FIGS. 16*b*, 17, and 18 are stored into the electronic record in the service center database 32. Upon completion of work, such data from the service center database 32 is sent to the RFID application in step 1350. In steps 1360 and 1370 the RFID application gets the repair information entered by the panel screens and writes or updates the repair information to the RFID tag via RFID transceiver 160. At this point, a determination is made whether the product needs further servicing. If not, the product is shipped back to the customer. If yes, the process begins again at step 1305 at another station.

Figure 19:
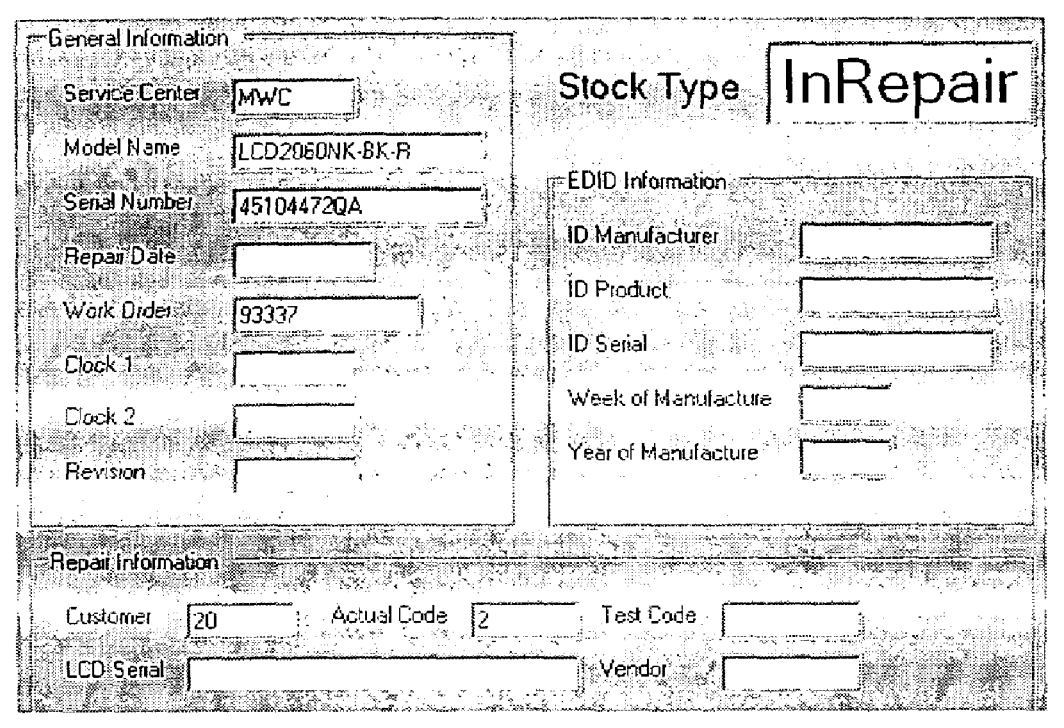

FIG. 19 shows a partial screen shot of the RFID application while the product is in repair as described in FIG. 14, according to an embodiment of the invention. FIG. 20 shows a partial screen shot of the RFID application while the product is in quality control as described in FIG. 14, according to an embodiment of the invention.

It should to appreciated that as a product moves through a servicing facility, the updated maintenance and status data in the electronic record are written to the RFID tag and stored to a service center database 32. Such data can be shared by the service facility to the customers timely and easily via network application. In addition, if in the future, the product needs more maintenance work, the RFID tag located on the product can readily provide a full product history, thereby, reducing the initial test time and overall cost of maintenance. In addition, the RFID tag allows a completely different servicing facility to obtain a complete maintenance history.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

I claim:

1. A computer implemented method of creating, within a service center system database, an electronic record for a product requiring servicing, said method comprising:
   receiving and authorizing a product servicing request to a service center system;
   creating an electronic record for the request in both the service center system database and in an RFID tag associated with the product;
   correlating the RFID tag with the product;
   updating the electronic record in both the service center system database and the RFID tag with servicing data.

2. The computer implemented method of claim 1, wherein creating and updating an electronic record in the RFID tag is based on electronic records previously stored in the service center system database.

3. The computer implemented method of claim 1, further comprising:
   accessing the electronic record over an electronic network connection.

4. The computer implemented method of claim 3, wherein electronic network is a computer network.

5. The computer implemented method of claim 3, wherein the computer network is Internet.

6. The computer implemented method of claim 1, further comprising: printing product information on the RFID tag and encoding the RFID tag with said electronic record.

7. The computer implemented method of claim 1, wherein electronic record includes Request Material Authorization (RMA) data.

8. The computer implemented method of claim 1, further comprising: extracting product information directly from product hardware; and storing the extracted product information to the electronic record.

9. The computer implemented method of claim 1, wherein the product servicing request and the product requiring servicing are received from a customer;
   the RFID tag is attached to the product requiring servicing; and
   the customer accesses the electronic record for the product requiring servicing stored within the service center system database over a computer network.

10. A system for creating, within a service center system database, an electronic record for a product requiring servicing, said system comprising:
   a communications device configured to receive, and authorize a product servicing request to a service center system;

an RFID tag configured with information associated with the product requiring servicing; and a computing device configured to create an electronic record for the request in both the service center system database and the RFID tag and update the electronic record in both the service center system database and the RFID tag with servicing data.

11. The system of claim 10, wherein the creation and update of the electronic record in the RFID tag is based on electronic record previously stored in the service center system database.

12. The system of claim 10, further comprising: a customer computing device having access to the electronic record over a electronic network connection.

13. The system of claim 12, wherein the customer computing device accesses said service center system database via computer network.

14. The system of claim 13, wherein computer network is Internet.

15. The system of claim 10, further comprising:
a printer printing product information on the RFID tag and encoding the RFID tag with said electronic record.

16. The system of claim 10, wherein electronic record includes Request Material Authorization (RMA) data.

17. The system of claim 10, further comprising:
a communication cable configured to extract product information directly from said product requiring servicing; wherein the service center system database stores the extracted product information to the electronic record.

18. The system of claim 10, wherein the product servicing request and the product requiring servicing are received from a customer;

the RFID tag is attached to the product requiring servicing; and the customer accesses the electronic record for the product requiring servicing stored within the service center system database over a computer network.

19. A method of tracking the servicing of a product at a service center, comprising:
receiving and authorizing a product service request to return a product to a service center for servicing;

generating an electronic record in a service center system database with information associated with the product requiring servicing;

receiving the product at the service center;

generating an electronic record in a radio-frequency identification (RFID) tag with information from the electronic record in the service center database;

associating the RFID tag with the product;

updating the electronic record in the service center system database and the electronic record in the RFID tag with additional information associated with the product requiring servicing; and enabling a customer to access the electronic record in the service center database via an electronic network.

20. The method of tracking in claim 19, further comprising:
electronically extracting product information from the product; and generating an electronic record in the RFID tag or in the service center system database with the electronically extracted product information.

* * * * *